E. EDWARDS.
Machines for Mixing and Kneading Dough.
No. 136,144. Patented Feb. 25, 1873.

Witnesses. Inventor

2 Sheets--Sheet 2.

E. EDWARDS.
Machines for Mixing and Kneading Dough.

No. 136,144.

Patented Feb. 25, 1873.

Witnesses

Inventor
Edmund Edwards

UNITED STATES PATENT OFFICE.

EDMUND EDWARDS, OF LONDON, ENGLAND.

IMPROVEMENT IN MACHINES FOR MIXING AND KNEADING DOUGH.

Specification forming part of Letters Patent No. 136,144, dated February 25, 1873.

*To all whom it may concern:*

Be it known that I, EDMUND EDWARDS, engineer, of No. 22 Southampton Buildings, London, England, have invented certain Improvements for Mixing and Kneading Dough; and I do hereby declare that the following is a full, clear, and exact description thereof, reference being had to the accompanying drawing making part of this specification, in which—

Figure 1:
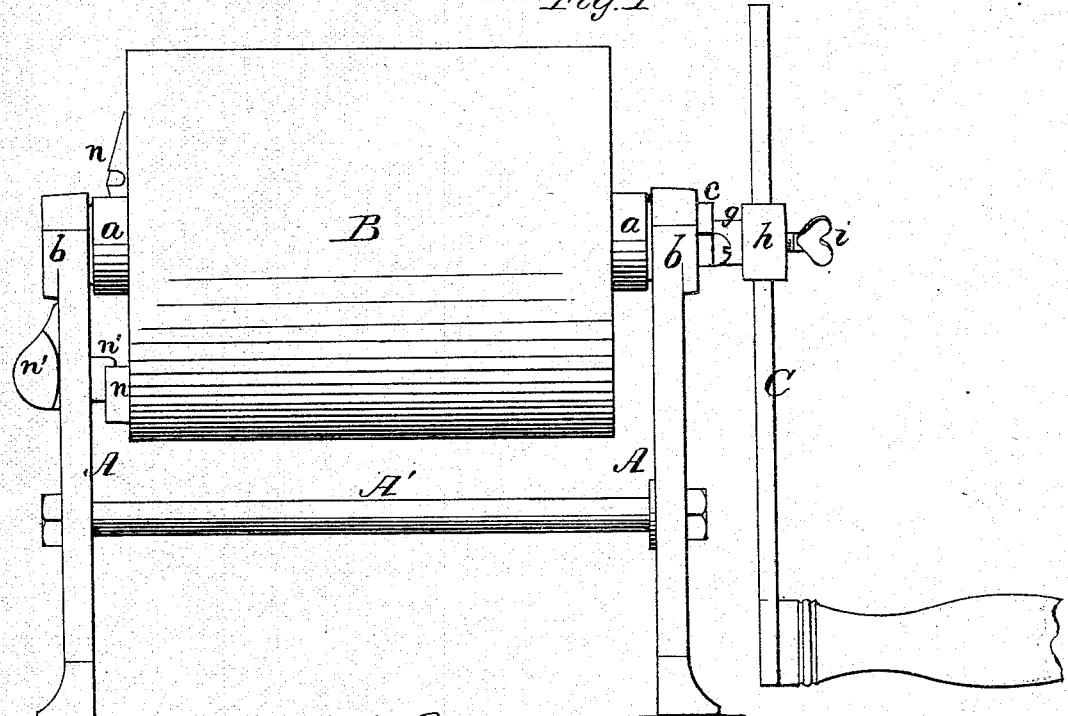
Figure 2:
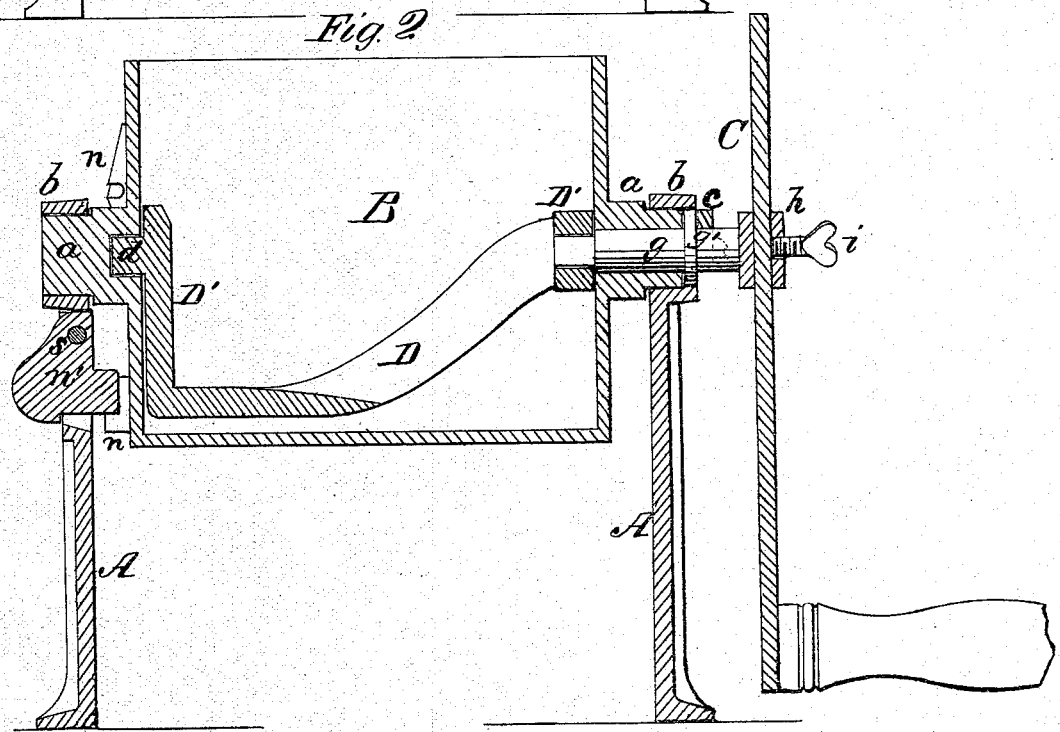
Figure 3:
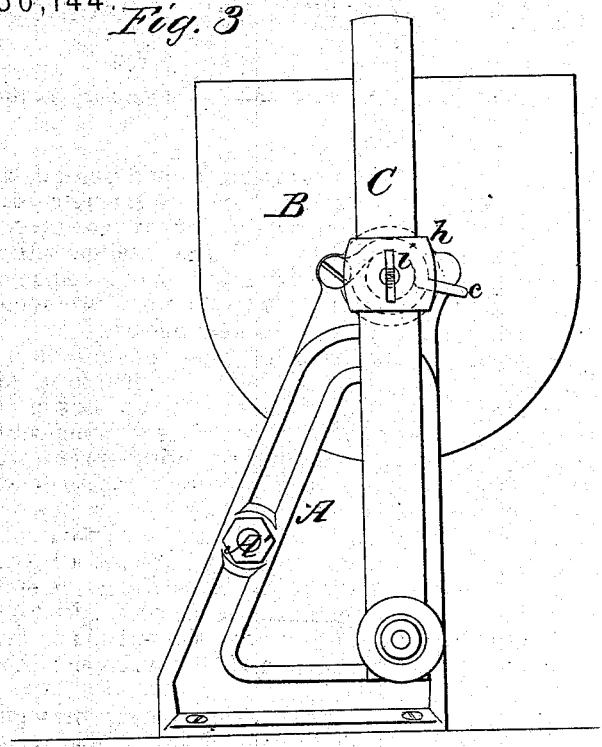
Figure 5:
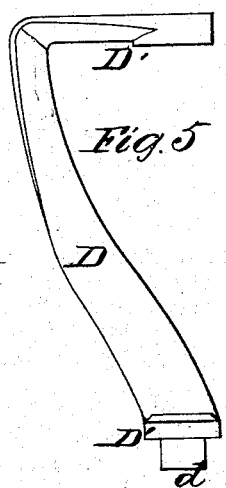
Figure 4:
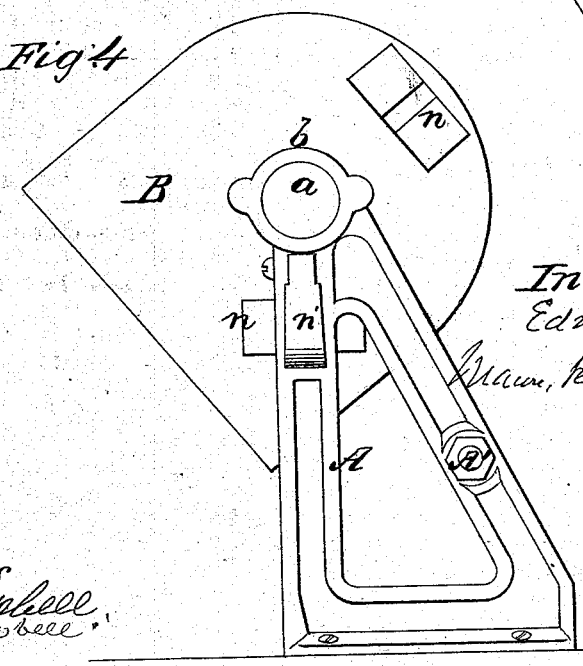

Figure 1, Plate 1, is an elevation of one side of the apparatus. Fig. 2, Plate 1, is a section taken vertically and longitudinally through the center of the apparatus. Fig. 3, Plate 2, is an elevation of one end of the apparatus. Fig. 4, Plate 2, is a view of the opposite end of the apparatus, showing the trough tilted. Fig. 5 shows the mixing and kneading bar.

Similar letters of reference indicate corresponding parts in the several figures.

This invention relates to certain novel improvements which are applicable to the mixing and kneading of dough or other substances, as will be hereinafter explained.

The following description of my invention will enable others skilled in the art to understand it.

In the accompanying drawing, A A represent two standards which rise from a suitable foundation, and are securely connected together by a horizontal bar, A'. This is the frame of the apparatus, which may be constructed in any suitable manner, but which is preferably made with one vertical side, as shown in Figs. 3 and 4. The upper ends of this frame afford bearings $b\ b$ for the trunnions $a\ a$ of a mixing trough or vessel, B, which allow this vessel to be tilted or inverted for discharging its contents. For the purpose of holding the trough firmly in the position shown by Fig. 3, or in the tilted position shown by Fig. 4, lugs or notched and beveled-faced bosses $n$ are applied on one end of the trough, and a gravitating catch, $n'$, is pivoted at $s$ to one of the standards A of the frame so as to automatically engage with either one of the said bosses and hold the trough in the required position.

This trough B may be made wholly of metal, or it may be made of metal and wood combined; or it may be made of porcelain or earthenware, or of any other suitable material or materials. In a plan view the trough shown in the drawing is quadrilateral, and in vertical section it presents a semicircular bottom with flaring sides. It may, however, be made circular in horizontal section with a hemispherical bottom; or it may be made cylindrical in vertical section, and of two horizontal halves suitably hinged together.

Inside of this trough B is a mixing and kneading bar, D, which turns about an axis that coincides with the axis of the trunnions $a\ a$. The bar D is of a helical form, so that its scraping or acting surface will come into operation gradually, and the ends of this bar terminate in arms D' D', one of which has a stud, $d$, on it that is fitted into one of the trunnions $a$, while the other arm has a prismatic hole through it that receives the end of a spindle, $g$, as shown in Fig. 2.

If desirable, the spindle $g$ may be screwed into the arm D'; but I prefer the simpler plan shown.

The spindle $g$ passes through one of the trunnions $a$, and has a collar, $g'$, and a slotted head, $h$, formed on it. The collar $g'$ and a pivoted catch, $c$, prevent the spindle from casual displacement, while the slotted head $h$ is designed to receive through it a lever, C, which is secured fast by a set-screw, $i$, and which is provided with a suitable handle.

This lever may be made of any desired length, and the distance from its handle to the spindle $g$ can be increased or diminished at pleasure, according as the resistance on the bar D varies.

It will be seen from the above description that I have a mixing and kneading trough which is mounted in a frame in such manner that it can be tilted or held in an erect position at pleasure; also, that I have arranged inside of this trough a mixing and kneading bar of a peculiar form, which bar can be rotated or oscillated by means of an adjustable lever; also, that by simply raising the catch $c$ and removing the spindle $g$ the said bar D can be taken out of the trough.

When it is desired to construct the apparatus on a large scale a spur-wheel may be applied on the outer end of the spindle $g$ and driven by a pinion, either manual or other power being employed for this purpose.

Instead of a simple helical bar, D, a number of blades may be applied to the single bar, at right angles to it, so as to work vertically through the material being mixed.

What I claim as new, and desire to secure by Letters Patent, is—

1. The vessel or trough B mounted on standards A by means of trunnions $a\ a$, one of which is hollow and receives through it the rotary driving-stem $g$ of the mixing and kneading bar D, in combination with the automatic locking device $n\ n'$ for holding the vessel B either in an upright position or in an inclined or inverted position, substantially as described.

2. The mixing and kneading device consisting of arms D' D' and a bar, D, which is the segment of a helix, said arms D' D' being hung inside of the vessel B so as to rotate therein and operate as herein set forth.

3. The combination, with the removable stem $g$ of the mixing and kneading device, of the adjustable crank or lever C, loop $h$, and set-screw $i$, substantially as described.

In testimony whereof I have signed my name to this specification in the presence of two subscribing witnesses.

EDMUND EDWARDS.

Witnesses:
CHARLES JAMES WINTERSGILL,
JAMES BLACK.